United States Patent [19]

Messerschmidt

[11] 4,134,560

[45] Jan. 16, 1979

[54] HELICOPTER CONTROL DEVICE

[76] Inventor: Eugene D. Messerschmidt, 8132 E. Impala, Mesa, Ariz. 85208

[21] Appl. No.: 834,233

[22] Filed: Sep. 19, 1977

[51] Int. Cl.² ........................................... B64C 27/58
[52] U.S. Cl. ............................... 244/83 F; 244/17.25; 74/471 XY
[58] Field of Search .............. 244/17.11, 17.2 S, 83 R, 244/83 F, 83 B, 83 C, 17.13, 83 J; 74/471 R, 471 XY, 491

[56] References Cited

U.S. PATENT DOCUMENTS

| | | | |
|---|---|---|---|
| 1,190,374 | 7/1916 | Capdevila | 244/83 F |
| 2,076,088 | 4/1937 | Malinowski | 244/83 B |
| 2,386,709 | 10/1945 | Osborn | 244/83 B |
| 2,460,374 | 2/1949 | Walls | 244/83 B |
| 2,505,020 | 4/1950 | Weisman | 244/83 B |
| 3,350,956 | 11/1967 | Monge | 244/83 F |
| 3,543,599 | 12/1970 | Caswell | 74/471 R |
| 3,971,536 | 7/1976 | Rollins, Jr. | 74/471 R |
| 4,062,508 | 12/1977 | Stephens et al. | 244/83 F |

Primary Examiner—Galen L. Barefoot
Attorney, Agent, or Firm—Gregory J. Nelson

[57] ABSTRACT

A helicopter control system for controlling cyclic pitch, collective pitch, throttle and rudder. A handle is secured to a vertical shaft slidable or telescopic within a cylindrical tube. A locking device permits the tube and shaft to be moved as a unit to control cyclic pitch. Vertical movement of the shaft controls collective pitch. Rotation of the shaft controls the tail rotor. A twist-grip on the handle is provided for throttle control. The handle may be adjusted through a ball joint for pilot comfort.

5 Claims, 3 Drawing Figures

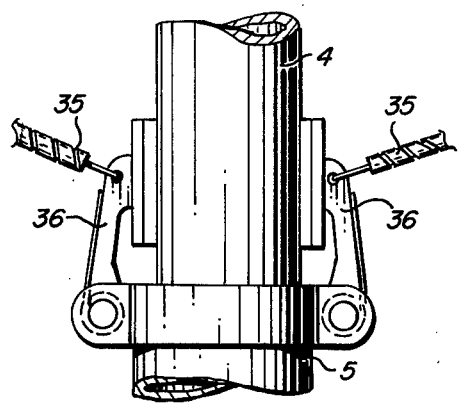
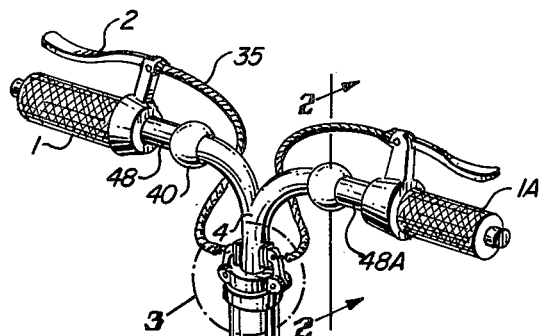
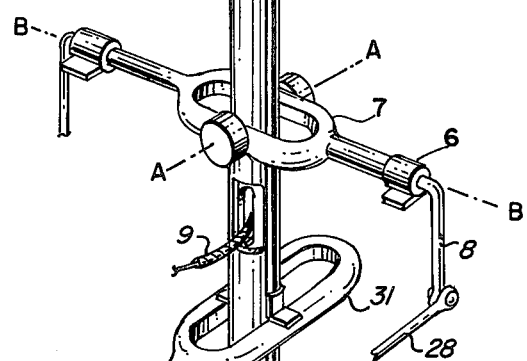
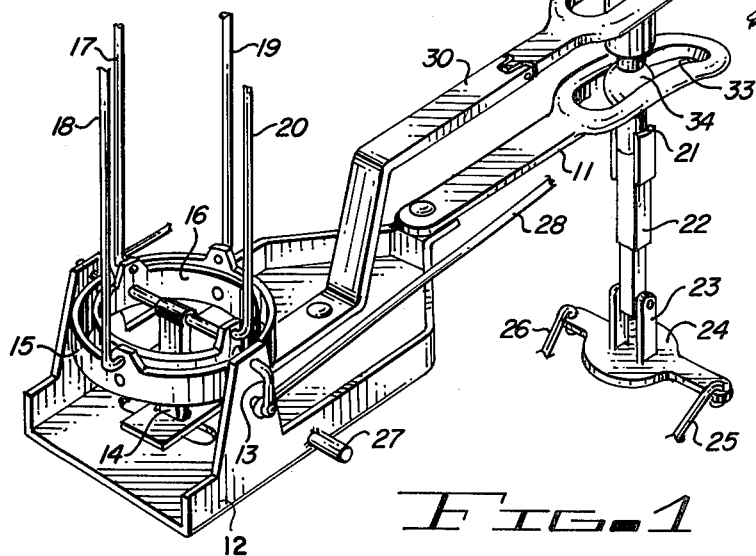
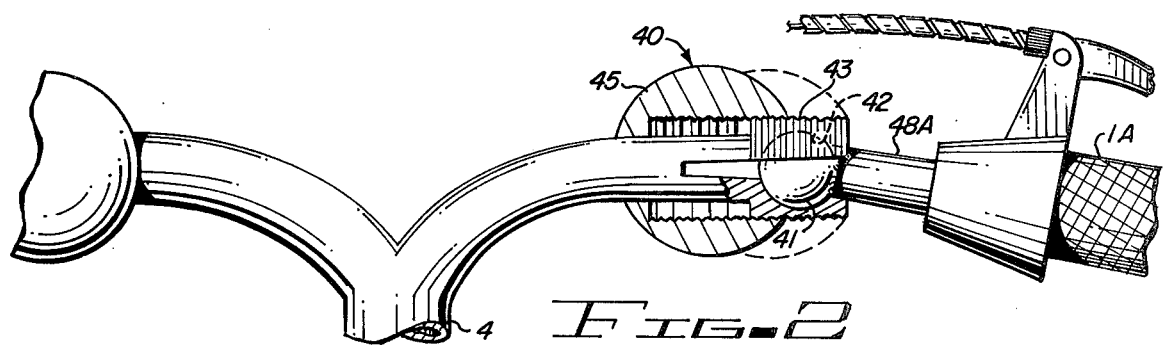

HELICOPTER CONTROL DEVICE

The present invention relates to a helicopter control system and more particularly relates to a single control stick for controlling collective pitch, throttle, anti-torque or tail rotor control and cyclic pitch control.

There are four controls in a conventional helicopter that the pilot normally uses. These are the collective pitch control, engine throttle control, anti torque control which is normally the tail rotor control and cyclic pitch control.

Collective pitch is generally controlled by the collective pitch lever or stick located at the left side of the pilot's seat. This stick is operated by the pilot with the pilot's left hand. The collective pitch control is the primary altitude control and as the collective pitch lever stick is raised and lowered there is a simultaneous and equal increase in the pitch angle of all of the main rotary blades. The amount of movement on the stick controls the degree of pitch change.

The throttle is located on the forward end of the collective pitch lever and is generally a twist-type grip. The throttle regulates the engine rpm and consequently the rpm of the main rotor. In most systems, rpm is automatically adjusted with collective pitch adjustments. However, manual adjustment of the throttle can also be used to maintain constant or desired rpm.

The tail rotor produces a torque or thrust which is governed by the position or lever pedals located on the floor of the craft in front of the pilot. The pedals are linked to a pitch change mechanism in the tail rotor gear box to permit the pilot to increase or decrease the pitch of the tail rotor blades and to counteract the torque effect of the main rotor.

The cyclic pitch control serves to change the position of the rotor disc and accordingly tilt the tip-path plane of the rotor in the desired direction to achieve horizontal motion. The cyclic pitch control consists of a cyclic stick which when moved tilts the rotor through appropriate linkage and through the swash plate.

From the foregoing, it will be appreciated that controlling the flight of a helicopter involves the coordinated effort of both of the pilot's hands and feet in the operation of the controls. Any change in one control will almost always require a coordinated correction on one or more of the other controls. For this reason, it is difficult if not impossible for a partially disabled person to effectively control a helicopter. For example, a military helicopter pilot who is wounded, would have difficulty in flying a helicopter if an arm were disabled. Similarly, a person having only the use of one hand would not be able to fly a helicopter.

The present invention provides a unique helicopter control system which enables the helicopter pilot to control all flight functions with the use of a single lever, and consequently a single hand. Briefly, the present invention provides a helicopter control system which combines the four primary helicopter controls within a single integral control unit capable of being actuated independently or in unison with any other control. This makes it possible for the pilot to perform several remote functions simultaneously. The control unit includes a handle which can be adjusted to a desired position for operator comfort at a ball joint. The end of the handle terminates at a throttle twist-grip. The handle is attached to a vertical shaft or lever which is slidable or telescopic within a cylindrical tube. A locking device carried on the tube can be engaged to move the handle shaft and tube in unison to control cyclic pitch. A manually operated lever at the twist-grip can be actuated to disengage the locking device so that shaft can move independently of the tube. Vertical movement of the shaft through the tube controls collective pitch. Rotation of the shaft controls the tail rotor to counteract the torque effects of the main rotor. The control tube and shaft are connected through conventional mechanical linkages such as ball and socket joints and gimbals to the tail rotor and rotor head assembly. The control unit of the present invention is compatible with conventional rotor systems and can be retrofit into existing rotating wing aircraft.

The above and other objects and advantages of the present invention will become more apparent from the following description, claims and drawings in which:

FIG. 1 is a perspective view of the control system of the present invention and is viewed from the pilot's seat with a portion of the floor of the aircraft cut away to show the control connections;

FIG. 2 is an enlarged detail view of the pivot adjustment on the handle of the control; and FIG. 3 is an enlarged detail view of the locking device for selectively placing the control shaft and tube in engagement.

As pointed out above, present helicopters have four separate controls that a pilot must use constantly during flight:

(1) collective pitch;
(2) throttle for altitude and speed control;
(3) a cyclic stick for control of fore, aft and lateral movement; and
(4) two pedals which control the tail rotor for yaw control.

The present invention combines all operations into a single integral unit which can be operated by one hand requiring less pilot energy, thereby reducing fatique for greater pilot comfort and safety.

Turning now to the drawings, the control system of the present invention is generally designated by the numeral 10 and includes generally vertical control shaft or lever 4 which is slidable relative to vertical control tube 5. Tube 5 is secured to fulcrum 7 along horizontal axis A—A. Bearing members 6 disposed at opposite sides of tube 5 are secured to the air frame generally at or below the floor of the aircraft. It will be obvious that tube 5 can be pivoted about either axis A—A or B—B. Axis A—A and B—B are at right angles to one another in the horizontal plane.

Control shaft 4 in tube 5 is connected to two conventional control linkages to operate tail rotor, or yaw, and main collective pitch. The linkages for controlling cyclic pitch, collective pitch and the tail rotor are more or less conventional. A brief description of these control linkages will be set forth to assist in the understanding of the present invention, although it is to be understood that the control linkages do not form a part of the present invention and that the present invention can be utilized with various control linkage systems. A gimbal housing 12 is pivotally secured at axis 27. Gimbal housing 12 secures gimbal rings 15 and 16 and attached links 17, 18, 19 and 20 which are secured to the swash plate of the rotor head, not shown. Lever 14 serves to tilt gimbal ring 16. Lever 13 is secured to gimbal ring 15 and is actuated through rod 28 and lever 8 which is attached to the fulcrum 7.

Lever 30 is pivoted on housing 12 and also hingedly fixed to slotted link 31 which is secured about the lower end of tube 5. Lever 11 is adjacent lever 30 and is also secured to gimbal housing 12 and is slotted at 33 to encompass ball joint 34. It will be obvious that link 31 will perform desired function when tube 5 is pivoted along the A—A axis.

Control plate 24 is secured to the lower end of shaft 4 by telescoping tube 22. The lower end of telescoping tube 22 is secured to plate 24 at support 23. Control rods 25 and 26 can be horizontally moved and plate 24 can be rotated to control the tail rotor to maintain heading.

As mentioned above, the control stick of the present invention consists of a vertical hollow control tube 5 and a control shaft or lever 4 which is disposed within tube 5 and is movable relative to tube 5. At its upper end, shaft 4 forms opposite horizontal handles 48 and 48A which respectively terminate at throttle grips 1 and 1a. For convenience, description of only one of the handles will be set forth, it being understood that the control system can be provided with single or multiple handles to accommodate control from either the right or left side. Engine throttle is controlled by rotating the grip 1 attached to shaft 4. Grip 1 operates a flexible cable 9 which is connected to the engine throttle control. A control lever 2 is secured on handle 48 adjacent to grip 1 and can be actuated without moving the hand from the grip. A flexible cable 35 connects the lever 2 to locking device 3, having friction calipers 36 or detents which oppositely engage shaft 4 to secure shaft 4 and tube 5 for unitary operation. When lever 2 is depressed, locking device 3 is disengaged allowing control tube 5 and control lever 4 to move independently for yaw and altitude control as will be explained. Various other types of locking devices and clutches may be utilized as will be apparent to those skilled in the art.

As best seen in FIG. 2, a universal joint 40 is positioned on handle 48 to allow the handle to be adjusted to a position most comfortable for the pilot and then locked in place. Ball joint 41 is secured to handle 48 and rotative within seat 42 within externally threaded sleeve 43. Ball 45 is in threaded engagement with sleeve 43 and when loosened permits the relative position of the handle 48 to be adjusted. Other types of adjustment devices are known and may be utilized as will be apparent to those skilled in the art.

The present invention will be more completely understood from the following description of the operation of the control lever and the corresponding control changes effected by the lever. Collective pitch is controlled by depressing lever 2 which disengages locking device 3 and by applying vertical pressure to handgrip 1, moves shaft or lever 4 vertically. Lever 4 has a ball joint 34 concentrically attached near its lower end fitted into a socket 33 on lever 11. Lever 11 is pivoted on gimbal housing 12 to allow free lateral movement relative to the housing to allow lever 11 to follow lever 4 in its orbital positions. Vertical movement of shaft 4 is transmitted through lever 11 to gimbal housing 12 which is pivoted on a horizontal axis 27. With gimbal rings 15 and 16 mounted on the housing 12 as shown, displacement of the housing moves the gimbal rings vertically in unison to change the collective pitch of the lift rotor through the swash plate at the rotor head for vertical flight. The description of the rotor head systems has not been set forth in detail as this construction is well known in the art. Reference is made to the *Basic Helicopter Handbook*, published by the Federal Aviation Agency Flight Standards Service for further detailed construction units of the general type.

Changes in cyclic pitch of the lift rotor in the fore and aft helicopter axis are accomplished by moving the control tube 5 and shaft 4 as a unit forward or backward along axis A—A. This movement actuates lever 8 attached to the pivot fulcrum 7 fore or aft and transmits this action to lever 13 via connecting rod 28. As lever 13 is moved, it tilts gimbal ring 15 on housing 12 so that as the front of the gimbal ring raises or lowers, the rear will move in the opposite direction transmitting corresponding action to the lift rotor by means of connecting rods 18 and 19. Changes in cyclic pitch in the lateral helicopter axis are accomplished by moving the control tube 5 and shaft 4 as a unit either right or left of the center vertical position. This laterally pivots slotted lever 30. Lever 30 is pivotally attached to gimbal housing 12 so that any movement of the slotted end of lever 30 causes an opposite movement at its opposite end where it engages lever 14, which, in turn pivots gimbal ring 16. This action is transmitted to the lift rotor by connecting rods 17 and 20.

Universal joints 21 and 23 and telescoping tube 22 transmit rotational motion of lever 4 from any orbital position to horizontal swivel motion in the torque rotor control swivel arm 24 which is attached to a fixed base so that it can swivel in a generally horizontal path about a fixed point. Push-pull action is transmitted to the torque rotor by rods 25 and 26 to accomplish torque control.

Engine throttle is controlled by rotating twist-grip 1 attached to handle 48 which operates flexible cable 9 connected to the engine.

The present invention provides a unique control system for a helicopter which controls the four primary flight functions and allows a pilot to control these functions with the use of a single hand. The control can be operated integrally as a unit or can be operated independently to achieve the desired control function. The control system of the present invention is compatible with present-day conventional systems which can be retrofitted to these units.

Various modifications changes and alterations to the control system described will be apparent to those skilled in the art. To the extent that these changes, alterations, and modifications do not depart from the spirit and scope of the appended claims, they are intended to be encompassed therein.

I claim:
1. In a control system for a helicopter having:
   (i) a collective pitch control mechanism for changing the pitch angle of the rotor blades;
   (ii) a throttle control;
   (iii) a tail rotor control for changing the pitch of the tail rotor blades; and
   (iv) a cyclic pitch control mechanism for changing the tilt of the rotor disc;
an improved control comprising:
   (a) a first control means pivotally mounted for pivotal movement in at least two directions, said first control means being operatively connected to said cyclic pitch control;
   (b) second control means moveable relative to said first control means and operatively connected to said collective pitch control mechanism; and
   (c) locking means for selectively engaging or disengaging said first and second control means whereby said first and second control means can be locked in unitary engagement and said first and second control means moved in one pivotal direction to change the cyclic pitch in the longitudinal axis and moved in the other pivotal direction to change the cyclic pitch in the lateral helicopter axis and whereby said first and second levers can be disengaged and said second control means can be moved relative to said first control means to control collective pitch and rotated to operate the tail rotor control.

2. The control system of claim 1 further including means associated with said second control means for adjusting said throttle.

3. The control system of claim 1 wherein said first control means comprises a hollow tube and said second control means comprises a shaft slidably disposed within said tube.

4. The control system of claim 3 wherein said shaft includes a horizontal handle portion.

5. The control system of claim 4 including means for selectively adjusting the position of said handle portion.

* * * * *